United States Patent
Kohlhoff

(10) Patent No.: US 9,741,015 B2
(45) Date of Patent: Aug. 22, 2017

(54) MAP BASED ROUTING FROM BILL OF MATERIALS

(71) Applicant: Stephan Kohlhoff, Darmstadt (DE)

(72) Inventor: Stephan Kohlhoff, Darmstadt (DE)

(73) Assignee: SAP SE, Walldorf (DE)

( * ) Notice: Subject to any disclaimer, the term of this patent is extended or adjusted under 35 U.S.C. 154(b) by 951 days.

(21) Appl. No.: 14/010,262

(22) Filed: Aug. 26, 2013

(65) Prior Publication Data
US 2015/0058052 A1    Feb. 26, 2015

(51) Int. Cl.
*A01K 5/02* (2006.01)
*G06F 17/50* (2006.01)
*G06Q 10/08* (2012.01)
*G06Q 10/06* (2012.01)

(52) U.S. Cl.
CPC ..... *G06Q 10/0875* (2013.01); *G06Q 10/0631* (2013.01); *G06Q 10/083* (2013.01)

(58) Field of Classification Search
None
See application file for complete search history.

(56) References Cited

U.S. PATENT DOCUMENTS

| | | | |
|---|---|---|---|
| 6,846,684 B1 * | 1/2005 | Yazback | G05B 19/41865 438/14 |
| 7,317,959 B2 | 1/2008 | Pfander et al. | |
| 8,165,707 B2 | 4/2012 | Enright et al. | |
| 8,266,066 B1 * | 9/2012 | Wezter | G06Q 10/06 703/20 |
| 8,301,420 B2 | 10/2012 | Rollmann et al. | |
| 8,347,227 B2 | 1/2013 | Urbalejo et al. | |
| 8,392,364 B2 | 3/2013 | Horn et al. | |
| 8,401,687 B2 | 3/2013 | Kohlhoff | |
| 8,863,156 B1 * | 10/2014 | Lepanto | G06F 9/44521 719/328 |
| 2008/0262881 A1 * | 10/2008 | Hartel | G06Q 10/06 705/7.11 |
| 2009/0254535 A1 | 10/2009 | Eickelmann et al. | |
| 2009/0276072 A1 | 11/2009 | Grove et al. | |
| 2010/0161364 A1 * | 6/2010 | Lokowandt | G06Q 10/0631 705/7.12 |

(Continued)

OTHER PUBLICATIONS

"Connectivity SAP ERP—SAP MII—SAP ME (M11)", SAP Best Practices, Building Block Configuration Guide, (Jan. 2012), 1-25.

(Continued)

*Primary Examiner* — Fateh M Obaid
(74) *Attorney, Agent, or Firm* — Schwegman Lundberg & Woessner, P.A.

(57) ABSTRACT

A method and system includes a bill of materials stored on a computer readable storage device, listing multiple components to be assembled. A mapping table is stored on a computer readable storage device having rows listing attributes of components of the bill of materials and a routing operation attribute identifying work centers or another unique attribute. A plurality of routing templates stored on a computer readable storage device, the routing templates identifying work centers and routing operations between work centers. A route generator utilizes the mapping table to map components from the bill of materials to a routing template and its operations.

12 Claims, 7 Drawing Sheets

(56) References Cited

U.S. PATENT DOCUMENTS

2012/0130521 A1* 5/2012 Kohlhoff ............... G06T 19/00
                                                                                                           700/98
2014/0364985 A1* 12/2014 Tiwari ............... G06Q 10/0875
                                                                                                           700/107

OTHER PUBLICATIONS

Berzosa, Alba, et al., "Integrating Manufacturing Execution and Business Management Systems With Soft Computing", Proceedings of the 10th International Conference on Computational and Mathematical Methods in Science and Engineering, (Jun. 27-30, 2010), 11 pgs.

Choi, Byoung K., et al., "MES (Manufacturing execution system) architecture for FMS compatible to ERP (Enterprise planning system)", International Journal of Computer Integrated Manufacturing, vol. 15, No. 3, (2002), 274-284.

Louis, Jan Philipp, et al., "Flexible Production Control—A Framework to Integrate ERP with Manufacturing Execution Systems", Proceedings of European and Mediterranean Conference Information Systems, (Jun. 24-26, 2007), 1-10.

Modrak, Vladimir, "Functionalities and Integration Possibilities of Manufacturing Execution Systems", Journal of Engineering, annals of faculty of engineering Hunedoara, Tome VII, (2009), 51-56.

* cited by examiner

MAP BASED ROUTING FROM BILL OF MATERIALS

BACKGROUND

Bill of materials (BOM) and routings exist in different systems for different purposes. While an engineering bill of material is structured for engineering purposes its counterpart in manufacturing is structured to reflect manufacturing needs. A product, which both describe (as designed and as manufactured), is the same.

A routing usually only exists in manufacturing systems. However, the manufacturing process is often distributed over an enterprise resource planning (ERP) system and a manufacturing execution system (MES). While the routing in the ERP system needs to make sure that parts are available at the right time (production schedule) in the right location (work center) and collects material consumption data and cost, the routing in the MES is much more detailed, because it needs to describe precisely the manufacturing workflow, including loops, repairs, conditional branches and so on which are not relevant in the ERP system.

Since an ERP routing and a ME routing are so different (technically as well as content wise) in the ERP and ME system it is almost impossible to achieve a reasonable mapping between these two. This, in turn, makes it almost impossible to create a robust interface between ERP and ME system for routings. Even if the routing can be transferred from the ERP system to the ME system, the routing would need to be enhanced in the ME system and this step would need to be repeated every time a new version of the routing is created and transferred, which makes this process prone to errors.

SUMMARY

A system includes a bill of materials stored on a computer readable storage device, listing multiple components to be assembled. A mapping table is stored on a computer readable storage device having rows listing attributes of components of the bill of materials and a routing operation attribute identifying work centers or another unique attribute. A plurality of routing templates stored on a computer readable storage device, the routing templates identifying work centers and routing operations between work centers. A route generator utilizes the mapping table to map components from the bill of materials to a routing template and its operations.

In one embodiment, a method includes obtaining a bill of materials identifying components in an order corresponding to an order of assembling the components during manufacture, selecting, via a programmed machine, a routing template based on a mapping table having an entry for each component that identifies the component and identifies a routing attribute for the component, and modifying the template based on the mapping table to generate a routing for the identified components.

A computer readable storage device includes instructions for causing a computer to implement a method. The method includes obtaining a bill of materials identifying components in an order corresponding to an order of assembling the components during manufacture, selecting, via a programmed machine, a routing template based on a mapping table having an entry for each component that identifies the component and identifies a routing attribute for the component, and modifying the template based on the mapping table to generate a routing for the identified components.

DETAILED DESCRIPTION

Figure 1:
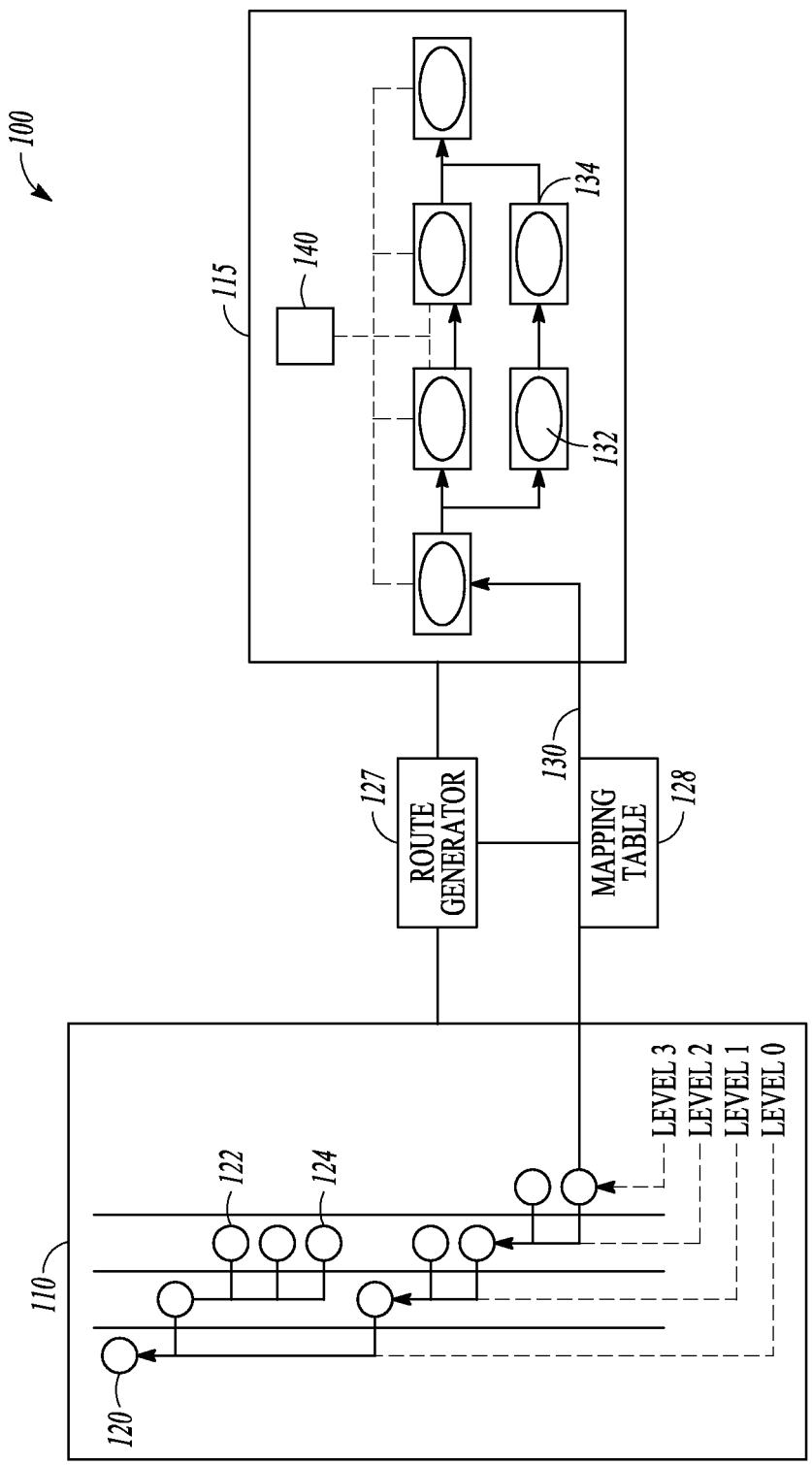
FIG. 1 is a block diagram illustrating a system and method of generating routes based on a bill of materials using a mapping table according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Several terms are used in the present application and are generally described in the following nomenclature list to aid in understanding the descriptions of various embodiments:

Part: Single physical object, which is manufactured and used in an assembly process to manufacture a product.

Material: An alternative term for part.

Assembly: A collection of parts, which are put together (assembled) to form a product or a semi-finished product.

BOM (Bill of Material): A collection of parts and assemblies which make up an assembly. A BOM may be part of a BOM, which will create a multi-level BOM BOM Item: A BOM item contains the reference to a part (material) and the quantity and other attributes. Also referred to as a BOM position.

BOM Component: A BOM component or component denominates a part in a BOM.

E-BOM: Engineering BOM, used to document a product from an Engineering perspective.

M-BOM: Manufacturing BOM, used to document a product from a Manufacturing perspective.

Routing: Set of operations in a predecessor-successor relationship, which is used to describe how a product or semi-finished product is being assembled.

Operation: Part (item) of a routing. An operation describes an activity at a certain work center, where a partial assembly process using certain components of a BOM is taking place. An operation has many attributes, like work centers, standard times, assembly aids (tools, work instructions), and component allocation of the respective BOM.

PLM System: Product Life-Cycle Management System, used for Engineering purposes to manage the product development and the life-cycle of products and parts.

ERP System: Enterprise Resource Planning System, used to support all Enterprise functions, like Finance, Controlling, Human Resource Management, Materials Management, Production Planning, Sales & Distribution, Quality Management, Service Management, Plant Maintenance.

ME System: Manufacturing Execution system, used to control the manufacturing execution on the shop floor down to the individual part and its flow through manufacturing, gathers feedback like order confirmation, percent of good parts, percent of scrap, percent of rework and the like.

Functional Name: An entry in a hierarchical classification system for parts, which indicates where a part is being used in a product. Example: a part 1234 has the description, bracket. If it has a functional name assigned, one could tell from the functional name, that, for example, this bracket is used to attach the battery to the car body in the engine compartment.

Bill of materials (BOM) and routings exist in different systems for different purposes. While an Engineering Bill of material is structured for Engineering purposes its counterpart in manufacturing is structured to reflect manufacturing needs. The product, which both describe (as designed and as manufactured respectively), may the same.

Routings of parts in a bill of materials may exist in multiple systems, each with different needs for the routings. Examples include a routing for a manufacturing system and a routing for an ERP system. The differences in respective routings are based on the needs of the systems. The manufacturing process is often distributed over an ERP system and a Manufacturing Execution system (MES). While a routing in the ERP system needs to make sure that parts are available at the right time (production schedule) in the right location (work center) and collects material consumption data and cost, the routing in the MES is much more detailed, because it needs to describe precisely the manufacturing workflow, including loops, repairs, conditional branches and so on which are not relevant in ERP systems.

The usual flow of data and information is as follows: E-BOM (Engineering/PLM System)→M-BOM (ERP System)→Routing (ERP System)→M-BOM & Routing (ME System). One example system is shown in FIG. 1 at 100, where an example BOM 110 is illustrated in a hierarchical file system, and an example routing 115 is illustrated in a flow diagram.

BOM 110 includes multiple levels, indicated as levels 0-3. In a zero level, a BOM header 120 is shown with multiple nodes, including multiple items 122 and parts at 124 indicated in levels 1-3 in leaf nodes. The organization in the hierarchy may be indicative of many different parts, including an overall assembly, subassemblies, and items and parts, which do not include further parts, residing at leaf nodes.

A route generator 127 uses the BOM 110 and a mapping table 128 to select a routing template, indicated as example routing 115, and allocates components at 130 to the routing 115, which consists of work centers 132 and routing operations 134, as well as a routing header 140, identifying the operation being performed on the components from the bill of materials 110. In some embodiments, each component may be routed to a work center for assembly of parts in a manufacturing type of routing. The initial allocation of parts may be done manually, based on the work flow of the manufacturing operations.

Since an ERP routing and a ME routing are so different (technically as well as content wise) in the ERP and ME system it is almost impossible to achieve a reasonable mapping between these two. This, in turn, makes it almost impossible to create a robust interface between ERP and ME system for routings. Even if the routing can be transferred from the ERP system to the ME system, the routing would need to be enhanced in the ME system and this step would need to be repeated every time a new version of the routing is created and transferred, which makes this process prone to errors. A work center in the ERP system may for example be an order for a part. The part may be ordered from a vendor or from inventory in various embodiments.

Since bill of materials are less complex such incompatibilities do not exist for them, or at least only to a manageable extent.

Instead of creating a routing in an ERP system and subsequently passing it on to the ME system, where it needs to be enhanced, a unified set of rules that is valid for the ERP system and the ME system are used to identify the routing from a set of templates which fits best, assigning the components to the routing operations automatically, making manual adjustments, if necessary, and finally updating the rule set (due to the manual adjustment) accordingly to achieve a "learning" system.

Figure 2:
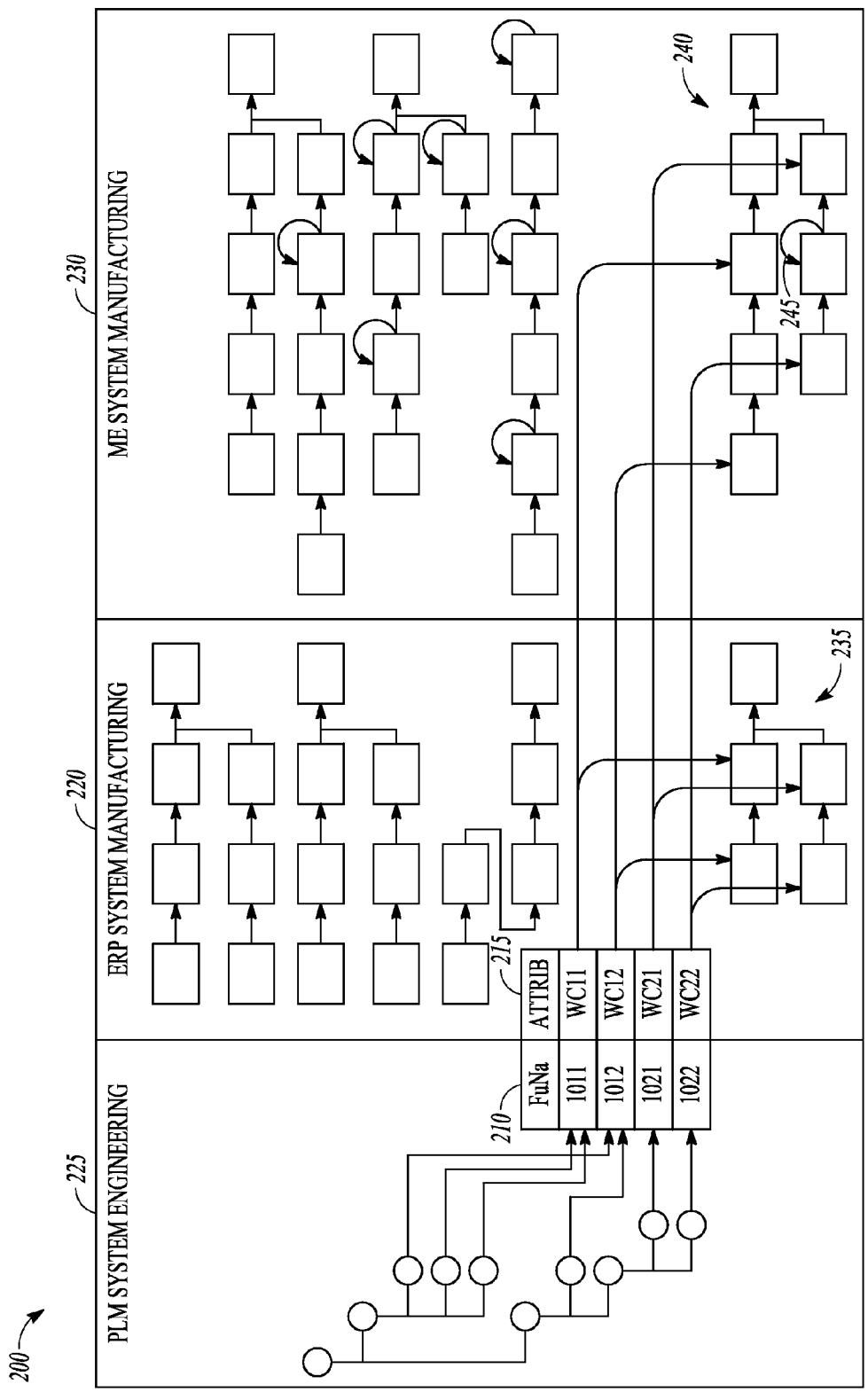
FIG. 2 is a block diagram illustrating a system and method of generating routes using a mapping table and template routes according to an example embodiment.

FIG. 2 is a block flow diagram illustrating a system 200 that generates a routing from a bill of materials using the mapping table 115 generally. A company specific code system is used, which defines a "Functional Name" indicated in column 210 for each usage of a part or assembly and relating this to an attribute in column 215 of the manufacturing routing. The definition of this attribute may be company specific as well. The process is as follows:

Define the components of an engineering BOM 110 which shall make up the M-BOM level by level. For each level this component list may be ordered according to a sequence of assembly. Components are selected from the engineering BOM 110 which are used to make a product or a semi-finished product. In one embodiment, the list is generated based on simply reversing the manufacturing process for a part or assembly that usually includes multiple components.

For each set of components making up a single-level manufacturing BOM, the most appropriate routing is found at 220 by mapping the Functional Name 210 of the BOM item via the mapping table 115 with routing attributes 215. The templates 220 may be generated for multiple different assemblies of components and included in a list that may be selected. Multiple lines 225 are shown logically illustrating components selected from the engineering BOM 110 to correlate to functional names 210 associated with the engineering BOM entry or row in the mapping table. Then, the appropriate routing with the corresponding routing operation is found. Both a selected ERP system routing template 220 and also to manufacturing routings at 230.

In one embodiment, an ERP routing 235 best fits the selected assembly, and manufacturing routing 240 best fits. Both routings are quite different, as they depend on the processes involved in dealing with the selected components. As mentioned above, the ERP routing is dependent on different processes to procure and deliver components to the manufacturing processes. The manufacturing processes may involve testing and rework as indicated by routing loop 245.

In one embodiment, to select the best routing, for all components of the single-level manufacturing BOM 110, all routing operations may be searched for the respective attribute value. For each routing having an appropriate operation the hit count will be increased.

Figure 3:
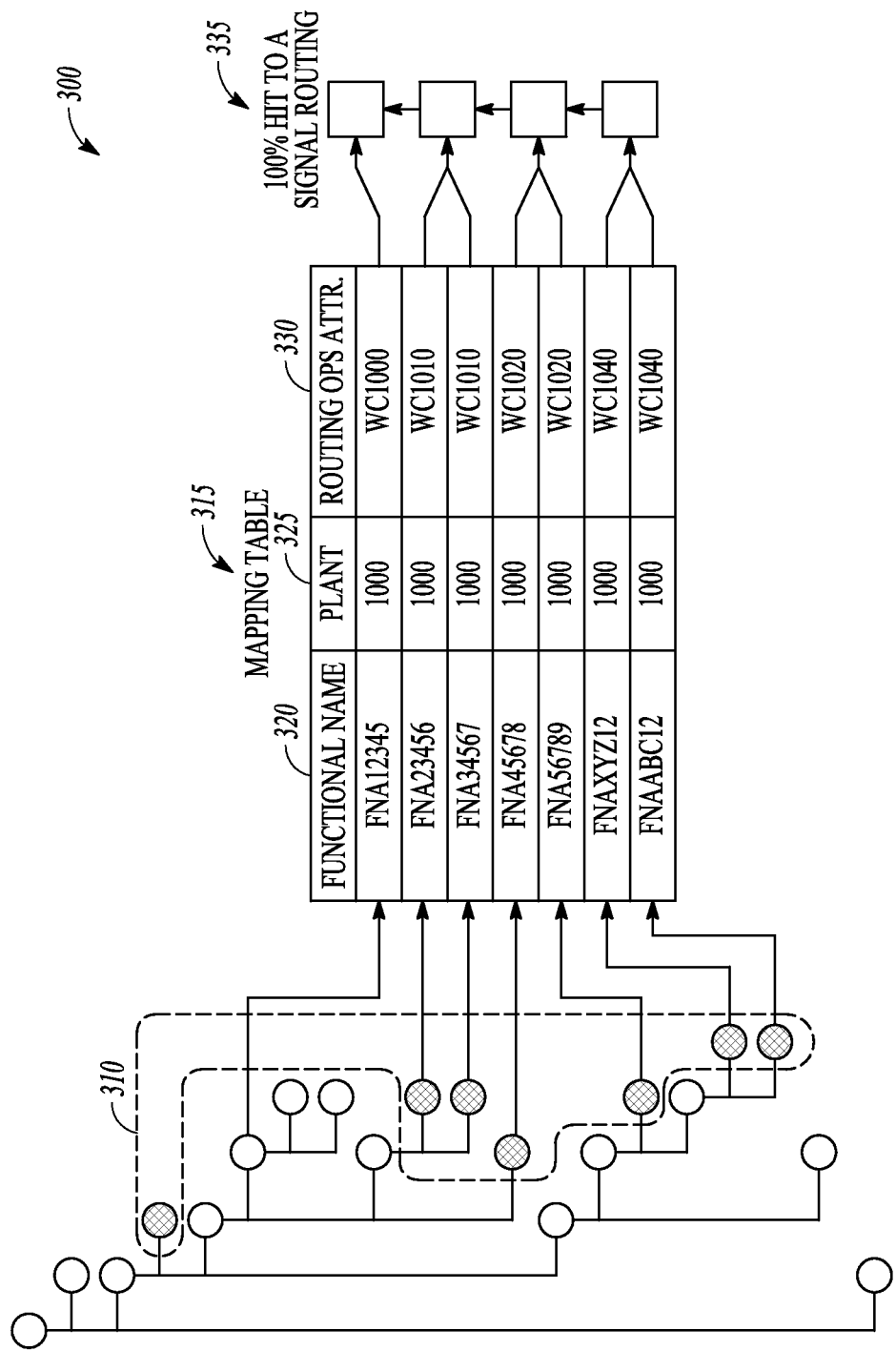
FIG. 3 is a block diagram illustrating a system and method of generating routes using a detailed mapping table according to an example embodiment.

The routing with the highest hit count will be linked to the manufacturing BOM 110 and the components will be assigned to the operation with the appropriate attribute value. FIG. 3 at 300 illustrates a BOM 310 having multiple components. The components are linked to a mapping table 315 that includes a function name column 320, plant column 325, and routing operation attribute identifying a work center and operation number at column 330. Each row in the mapping table corresponds to at least one work center or another unique attribute of an operation in a route at 335. This corresponds to a 100 percent hit to a single routing.

Figure 4:
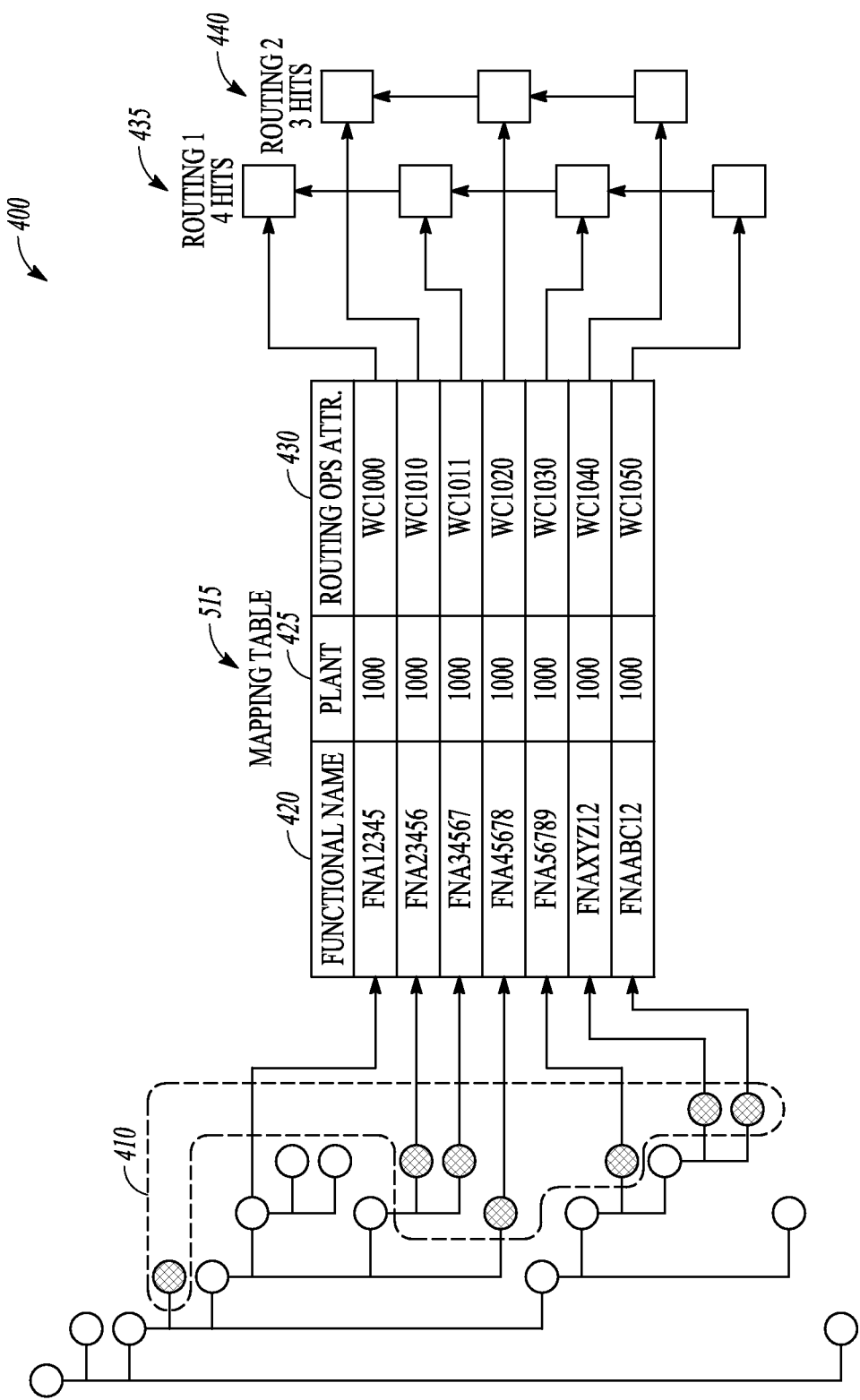
FIG. 4 is a block diagram illustrating a system and method of selecting a route template according to an example embodiment.

FIG. 4 illustrates at 400, a BOM 410 having multiple components. The components are linked to a mapping table 415 that includes a function name column 420, plant column 425, and routing operation attribute identifying a work center and operation number at column 430. Two potential routes, routing 1 at 435 and routing 2 at 440. Rows in the mapping table correspond multiple different work centers in each of the routes. However, route 1 at 435 has 4 hits, while route 2 only has 3 hits. Thus, route 1 at 435 is selected as the route template that best matches selected components in BOM.

Figure 5:
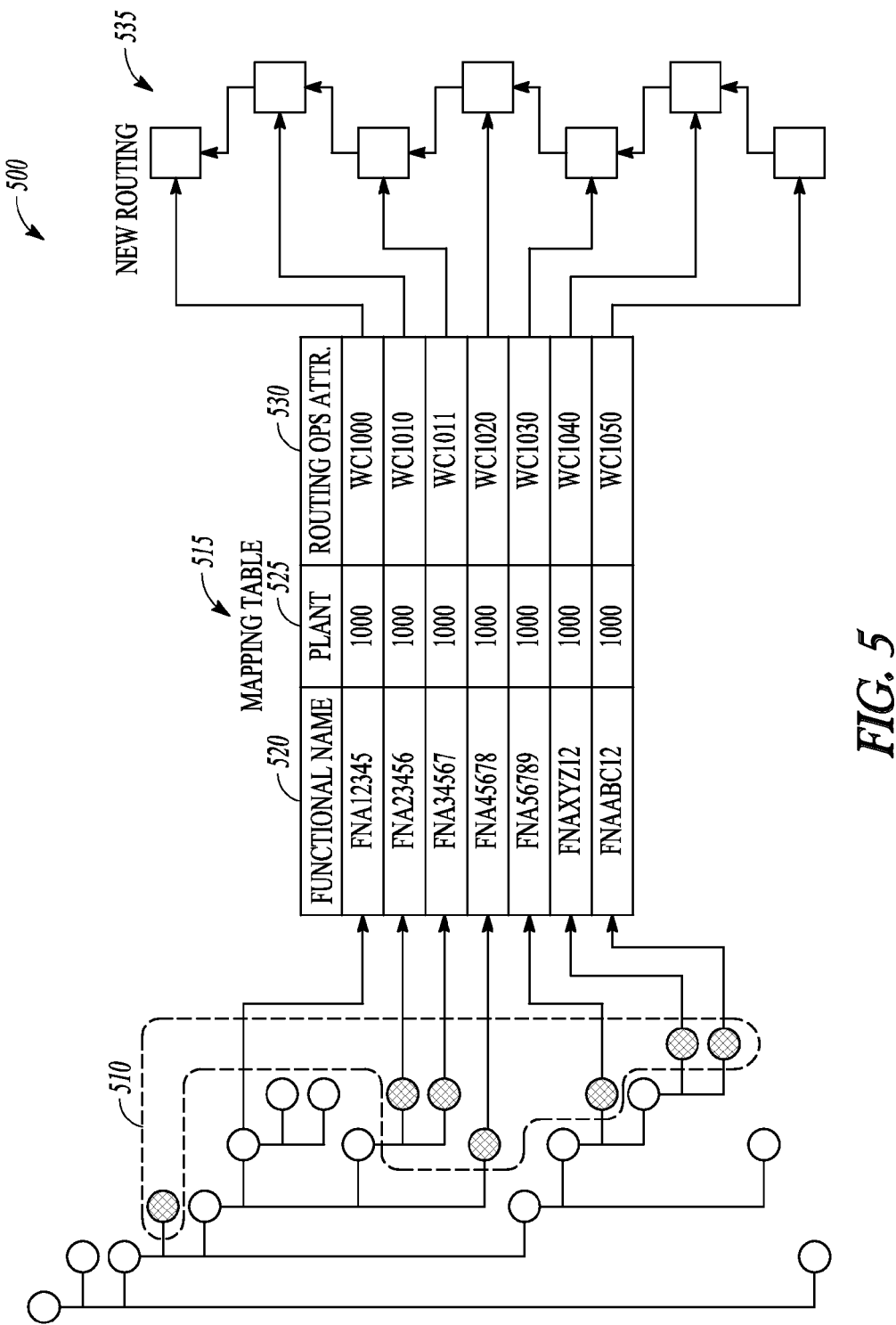
FIG. 5 is a block diagram illustrating a system and method of generating a new routing according to an example embodiment.

In some cases, more than one routing will be selected. As a resolution to more than one routing being selected, a user can choose one routing, adapt it, and make manual assignments of routes corresponding to operations. As an alternative, the operation of the routings can be combined to create a new routing with the respective assignments. FIG. 5 illustrates a method 500 of forming a new routing. A BOM 510 has multiple components. The components are linked to a mapping table 515 that includes a function name column 520, plant column 525, and routing operation attribute identifying a work center and operation number at column 530. Each row in the mapping table corresponds to at least one work center in a route at 535 which includes new routes due to partial hits on several routings.

If a component cannot be automatically assigned, because it matches an operation in another routing, the system 500 may propose to insert this operation automatically in the routing according to the assembly sequence defined by the BOM component sequence.

Figure 6:
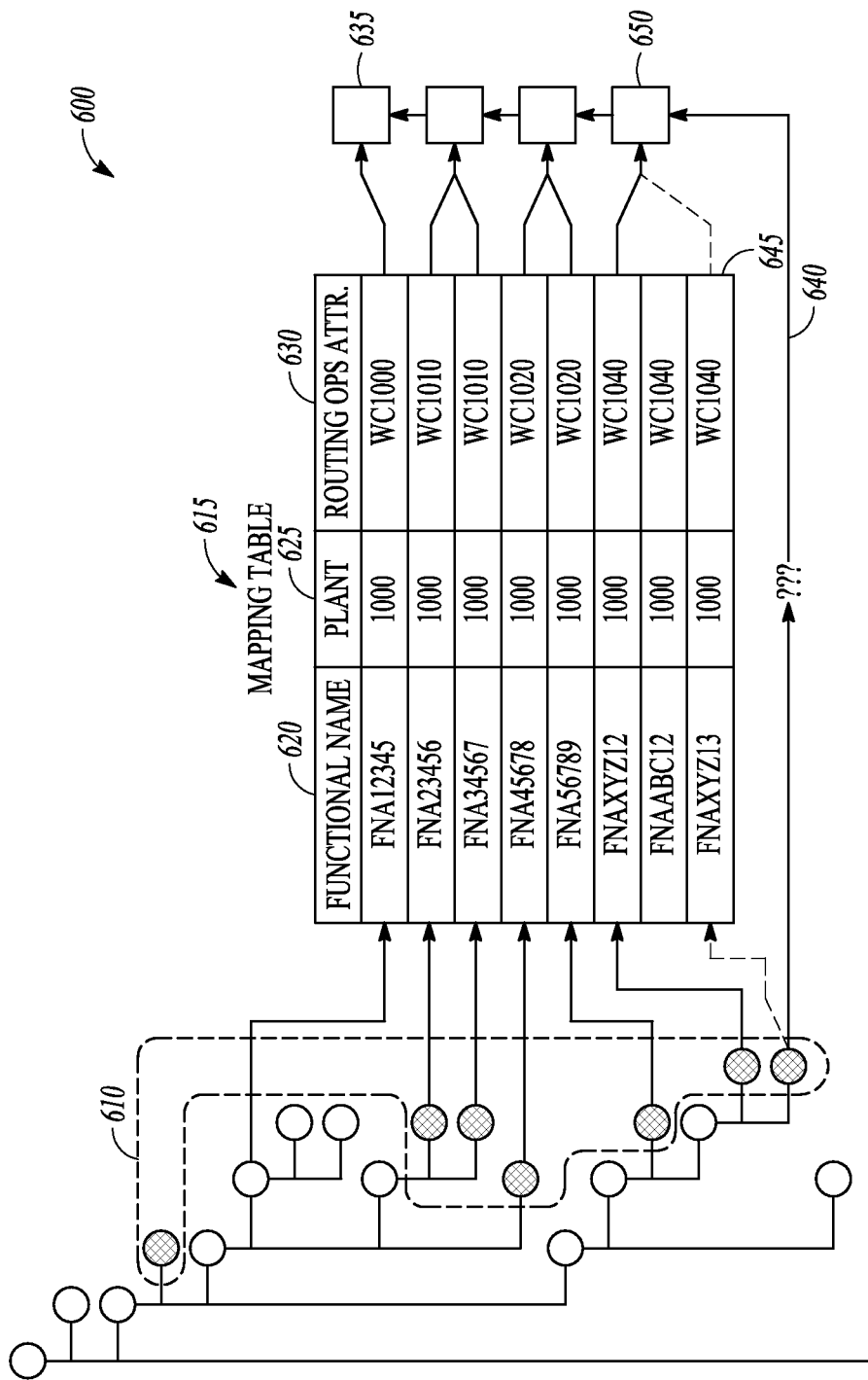
FIG. 6 is a block diagram illustrating a system and method of updating a mapping table with a manual assignment of a component according to an example embodiment.

If a component cannot be automatically assigned, because it matches no operation at all, the assignment needs to be done manually as illustrated at 600 in FIG. 6. A BOM 610 has multiple components. The components are linked to a mapping table 615 that includes a function name column 620, plant column 625, and routing operation attribute identifying a work center and operation number at column 630. Each row in the mapping table corresponds to at least one work center or another unique attribute of an operation in a route at 635. However, a component 637 does not initially have an entry in the mapping table. An assignment to a work center is made at 640, and a table row is added at 645. The component is then shown as assigned to work center 650.

This manual step could trigger an update of the mapping table to include the new relationship between the Functional Name and the routing operation attribute.

This process will be executed in the ERP system and the ME system. Although routings in the ERP system and ME system are different, the rules how to select a routing, assigning the components, and updating the routing if necessary are the same. They are just executed on differently structured routings, which both are used to control the assembly of the same product. This will make a transfer of the routing from the ERP system to the ME system and subsequent enhancements unnecessary. All what needs to be done to keep the ERP system and the ME system in sync is to have a link between the routing in the ERP system and the respective routing in the ME system including all the derived routings.

Figure 7:
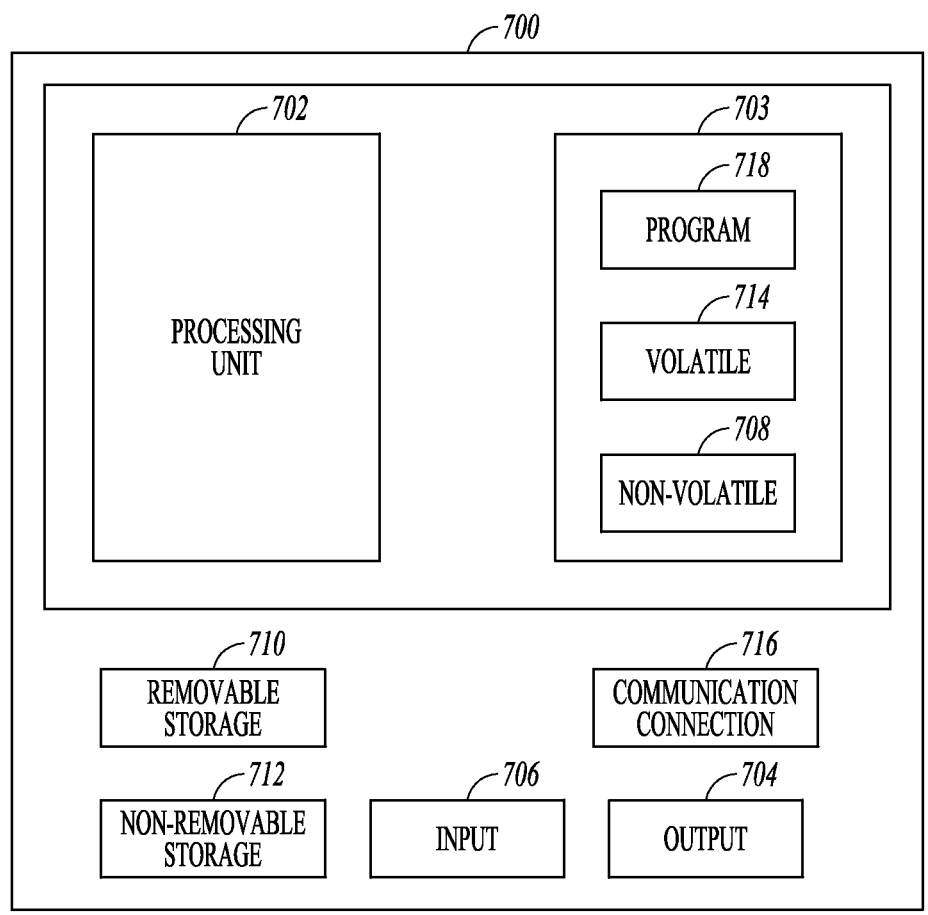
FIG. 7 is a block diagram of an example computer system for executing methods according to an example embodiment.

FIG. 7 is a block schematic diagram of a computer system 700 to implement one or more methods and storage devices according to an example embodiment. In one embodiment, multiple such computer systems may be utilized in a distributed network to implement multiple components in a transaction based environment. An object-oriented, service-oriented, or other architecture may be used to implement such functions and communicate between the multiple systems and components. One example computing device in the form of a computer 700, may include a processing unit 702, memory 703, removable storage 710, and non-removable storage 712. Memory 703 may include volatile memory 714 and non-volatile memory 708. Computer 700 may include— or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input 706, output 704, and a communication connection 716. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 700. A hard drive, CD-ROM, and RAM are some examples of articles including a non-transitory computer-readable medium. For example, a computer program 718 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 700 to provide generic access controls in a COM based computer network system having multiple users and servers.

EXAMPLES

1. A system comprising:
   a bill of materials stored on a computer readable storage device, listing multiple components to be assembled;
   a mapping table stored on a computer readable storage device having rows listing components of the bill of materials and a routing attribute;
   a plurality of routing templates stored on a computer readable storage device, the routing templates identifying work centers and routing operations between work centers; and
   a route generator to utilize the mapping table to map components from the bill of materials to a routing template and its operations.

2. The system of example 1 wherein the routing templates comprise templates for a manufacturing routing.

3. The system of example 2 wherein the routing templates for manufacturing routing include loops to handle rework.

4. The system of any of examples 1-3 wherein the routing templates comprise templates for enterprise resource planning routing.

5. The system of example 4 wherein the routing templates for enterprise resource planning include work centers for ordering components.

6. The system of any of examples 1-5 wherein the route generator includes code stored on a computer readable storage device to determine a number of hits on templates corresponding to the multiple components and selecting the template with the most hits to map the components.

7. The system of any of examples 1-6 wherein the mapping table includes a functional name for each component and the corresponding routing attribute identifying a work center.

8. The system of any of examples 1-7 wherein components in the bill of materials are listed in an order of manufacture.

9. The system of example 8 wherein when a component does not match an operation in a routing template, the route generator is adapted to insert the component into the routing template based on the order of manufacture in the bill of materials.

10. The system of example 8 wherein when a component does not match any operation, the route generator is adapted to allow a user to manually add an operation and to insert a row in the mapping table corresponding to the component and routing attributes that have been manually added.

11. A method comprising:
   obtaining a bill of materials identifying components in an order corresponding to an order of assembling the components during manufacture;
   selecting, via a programmed machine, a routing template based on a mapping table having an entry for each component that identifies the component and identifies a routing attribute for the component; and
   modifying the template based on the mapping table to generate a routing for the identified components.

12. The method of example 11 wherein the routing comprises a manufacturing routing that includes loops to handle rework.

13. The method of any of examples 11-12 wherein the routing comprises an enterprise resource planning routing that includes work centers for ordering components.

14. The method of any of examples 11-13 wherein selecting a routing template includes determining a number of operations in each of a plurality of templates corresponding to the bill of materials components and selecting the template with the most corresponding operations.

15. The method of any of examples 11-14 wherein the mapping table includes a functional name for each component and the corresponding routing attribute identifying a work center.

16. The method of example 15 wherein when a component does not match an operation in a routing template, the method includes inserting the component into the routing template based on the order of manufacture in the bill of materials.

17. The method of any of examples 15-16 wherein when a component does not match any operation, the method further comprises:
   allowing a user to manually add an operation; and
   inserting a row in the mapping table corresponding to the component and routing attributes that have been manually added.

18. A computer readable storage device including instructions for causing a computer to implement a method, the method comprising:
   obtaining a bill of materials identifying components in an order corresponding to an order of assembling the components during manufacture;
   selecting, via a programmed machine, a routing template based on a mapping table having an entry for each component that identifies the component and identifies a routing attribute for the component; and
   modifying the template based on the mapping table to generate a routing for the identified components.

19. The computer readable storage device of example 18 wherein the method is adapted to generate both a manufacturing routing that includes loops to handle rework and an enterprise resource planning routing that includes work centers for ordering components using the same bill of materials and mapping table.

20. The computer readable storage device of any of examples 18-19 wherein selecting a routing template includes determining a number of operations in each of a plurality of templates corresponding to the bill of materials components and selecting the template with the most corresponding operations.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:
   one or more hardware processors; and
   a computer readable storage device, coupled with the one or more processors, the computer readable storage device comprising:
   a bill of materials stored on the computer readable storage device, listing multiple components to be assembled;
   a mapping table stored on the computer readable storage device having rows listing components of the bill of materials and a routing attribute for each of the components, the mapping table identifying a uniform set of rules valid for a first system and a second system in a manufacturing process to synchronize the first system and the second system by creating a link between a routing of the first system and a routing of the second system, wherein the routing of the first system is structured differently than the routing of the second system;

a plurality of routing templates stored on the computer readable storage device, the routing templates identifying work centers and routing operations between work centers; and a route generator to map components from the bill of materials to a routing template and its operations using the mapping table;

the computer readable storage device including instructions, that when executed by the processor, cause the system to perform operations comprising:

analyzing the bill of materials to identify the components in an order corresponding to an order of assembling the components during manufacture;

linking the components to the mapping table;

determining a first routing template for the first system that best matches the components in the bill of materials based on the linking of the components to the mapping table;

selecting the first routing template from the plurality of routing templates based on the mapping table to generate a routing for the components;

determining a second routing template for the second system that best matches the components in the bill of materials based on the linking of the component to the mapping table:

selecting the second routing, template from the plurality of routing templates based on the mapping table to generate a routing for the components, wherein the first routing template is different than the second routing template; and modifying the selected second routing template based on the mapping table to generate a routing for the identified components.

2. The system of claim 1, wherein the routing templates comprise templates for a manufacturing routing.

3. The system of claim 2, wherein the routing templates for manufacturing routing include loops to handle rework.

4. The system of claim 1, wherein the routing templates comprise templates for enterprise resource planning routing.

5. The system of claim 4, wherein the routing templates for enterprise resource planning routing include work centers for ordering components.

6. The system of claim 1, the instructions further comprising:

determining a number of hits on templates corresponding to the multiple components and selecting the routing template with the most hits to map the components.

7. The system of claim 1, wherein the mapping table includes a functional name for each component and the corresponding routing attribute identifying a work center.

8. The system of claim 1, wherein components in the bill of materials are listed in an order of manufacture.

9. The system of claim 8, the instructions further comprising:

determining that a component of the components of the bill of material does not match an operation in the selected routing template; and inserting the component into the selected routing template based on the order of manufacture in the bill of materials.

10. The system of claim 1, the instructions further comprising:

determining that a component of the components of the bill of material does not match an operation in the selected routing template;

allowing a user to manually add an operation; and inserting a row in the mapping table corresponding to the component and routing attributes that have been manually added.

11. The system of claim 1, wherein selecting the first routing template from the plurality of routing templates based on the mapping table to generate a routing for the components further comprises:

modifying the selected routing template based on the mapping table to generate a routing for the identified components.

12. The system of claim 1, wherein selecting the first routing template from the plurality of routing templates comprises selecting more than one routing template, and the instructions further comprising:

combining the more than one routing templates to create a new routing template.

* * * * *